Jan. 21, 1936.  A. B. CHERETON  2,028,191
ALTERNATING CURRENT TO DIRECT CURRENT CONVERTER
Filed Oct. 5, 1934   2 Sheets-Sheet 2
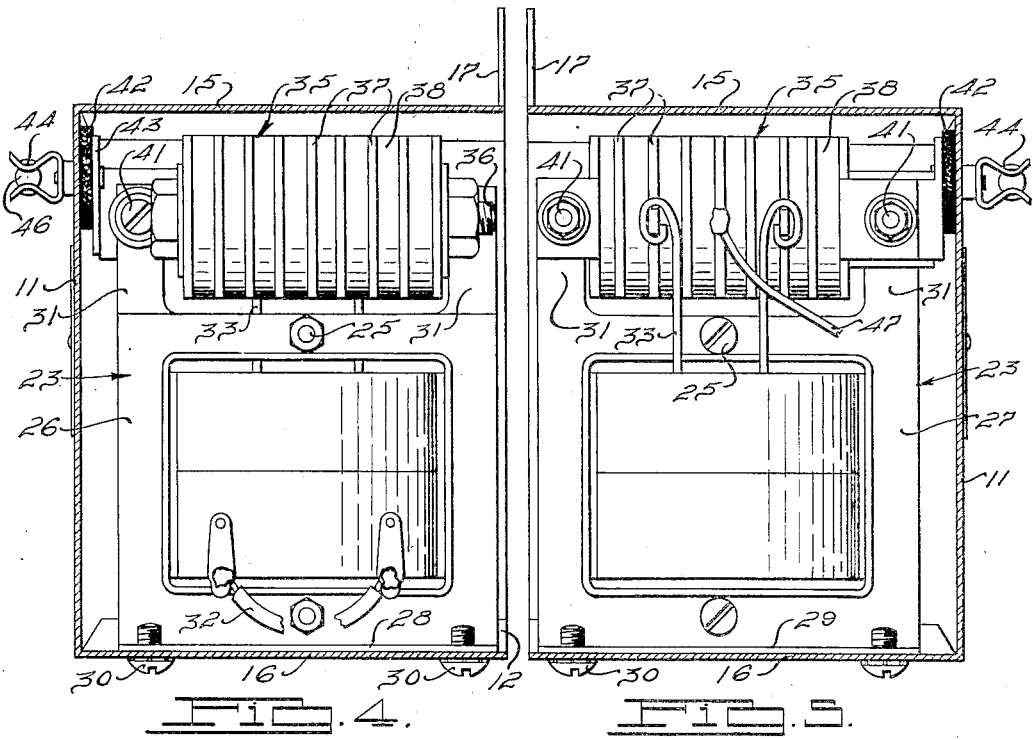
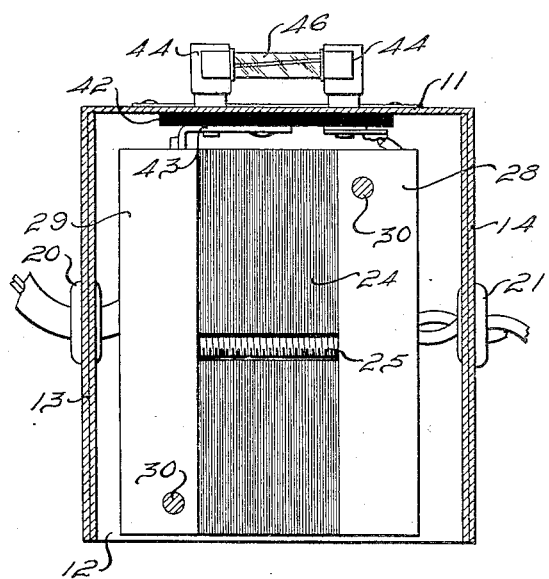
INVENTOR.
Avery B. Chereton.
BY
Harness, Dickey, Pierce & Ham.
ATTORNEYS.

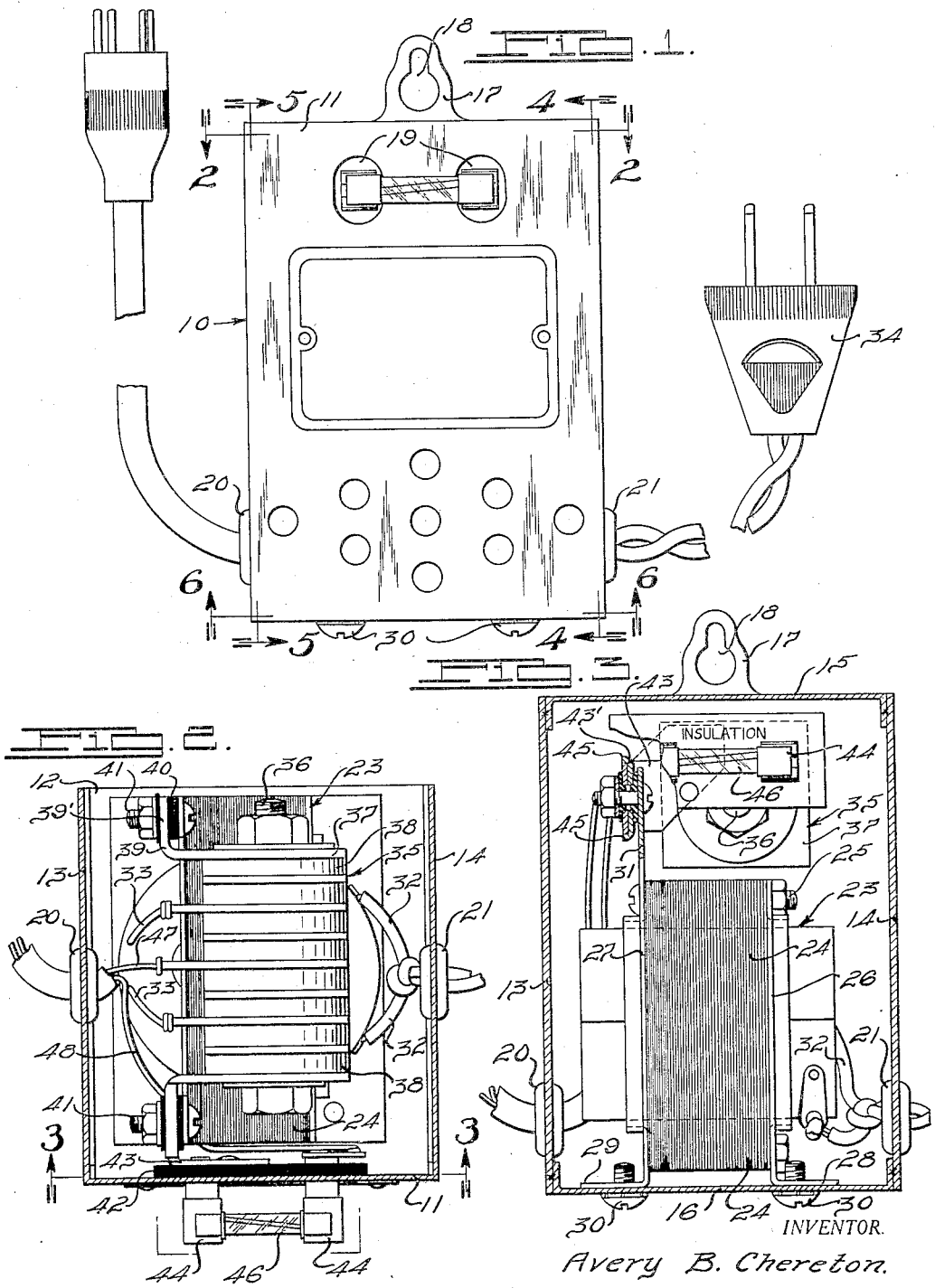

Patented Jan. 21, 1936

2,028,191

UNITED STATES PATENT OFFICE 2,028,191

ALTERNATING CURRENT TO DIRECT CURRENT CONVERTER

Avery B. Chereton, Detroit, Mich., assignor to E. S. Evans & Sons Company, a corporation of Michigan Application October 5, 1934, Serial No. 746,957

3 Claims. (Cl. 175—363)

This invention relates to an improved combined current rectifier and transformer.

More particularly, the invention relates to improved portable current rectifying and transforming units of the character employed in utilizing conventional alternating current circuit to operate low voltage, appliances and to charge storage batteries.

One of the main objects of the invention is to provide a unitary and compact device of this character in which the necessary structural parts of the transformer and rectifier may be mainly relied upon to rigidly retain various parts of the device in a predetermined assembled relationship without the aid of complicated and weighty fixtures and excessive numbers of bolts, screws, rivets and similar securing means.

Another object of the invention is to provide a device of this kind which is confined within a casing and provided with a conveniently accessible circuit protecting fuse located externally of the casing.

Other objects of the invention are to provide an improved transformer frame which has ears that extend beyond the core and coil of the transformer so as to support the current rectifying element of the unit in a compact relationship with respect to the transformer and independently of the casing of the device; to provide a unitary combined transformer and rectifier unit which is conveniently removable from its casing in an assembled condition; and to provide flanges on the conventional end plates of a current rectifier which register with the ears of the transformer and which are adapted to be affixed thereto by conventional attaching means.

Further objects of the invention are to provide a fuse plate that is normally confined in the casing of the device and which carries fuse coupling elements that extend through openings in one of the casing walls so as to accommodate removal and replacement of the fuse from the exterior of the casing; to provide an improved means for supporting the fuse plate and positively so locating the fuse coupling elements thereof with respect to the transformer and rectifier as to bring the fuse coupling elements into accurate alignment and concentricity with the openings in the casing through which they extend when the transformer and rectifier units are anchored in the casing; to provide sufficiently accurate alignment of the fuse coupling elements and their apertures to assure freedom from short circuiting of such elements by contact with the casing wall without the aid of insulating material or excessively large apertures in the casing wall through which the coupling elements extend; and to provide supporting means of this character which is securable to the transformer and rectifier units by one of the attaching members that is relied upon to fix these parts of the device together.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numbers refer to like parts throughout the several different views, Fig. 1 is a front elevational view of my improved unitary current modifying apparatus.

Fig. 2 is a horizontal sectional view taken on the line 2—2 of Fig. 1.

Fig. 3 is a horizontal sectional view taken on the line 3—3 of Fig. 2.

Fig. 4 is a vertical sectional view taken on the line 4—4 of Fig. 1.

Fig. 5 is a vertical sectional view taken on the line 5—5 of Fig. 1.

Fig. 6 is a horizontal sectional view taken on the line 6—6 of Fig. 1.

In the form shown in the drawings, the improved combined rectifying and transforming apparatus includes a casing, generally designated in Fig. 1 by the numeral 10, having a front wall 11 and a rear open side 12 between which opposite side walls 13 and 14 extend. The upper and lower extremities of the casing 10 are closed by upper and lower walls 15 and 16 respectively. Integrally formed on the upper wall 15 is an upwardly extending flange 17 having a bayonet type opening therein by which the casing may be conveniently suspended from a nail, screw or other similar supporting means. Formed in the front wall 11 of the casing adjacent the upper extremity thereof, are somewhat elongated openings 19 for receiving fuse coupling elements, hereinafter more clearly set forth. The side walls 13 and 14 of the casing are provided with apertures in which grommets 20 and 21, respectively, are inserted for the purpose of protecting the lead wires which extend into the interior of the casing and connect with the apparatus confined therein.

Disposed in the interior of the casing 10 is a combined current rectifying and transforming unit which includes a transformer, generally designated by the numeral 23, of the type commercially known as a bell transformer. The transformer 23 comprises a core 24 having a plurality of laminae which are secured together and to a frame structure by bolts 25 which extend through registering apertures in the core laminations and in frame side plates 26 and 27 disposed adjacent the opposite sides of the core. The frame side plates 26 and 27 are provided at their lower extremities with outwardly extending flanges 28 and 29, respectively, which engage the lower wall 16 of the casing and which are rigidly secured thereto by screws 30. The side plate 27 has a pair of integral, spaced, upwardly extending ears 31 which are located adjacent the side edges thereof and disposed substantially parallel to its plane. Wound on the transformer core 24 are primary and secondary transformer coils, the high voltage coil being electrically connected with alternating current input conductors 32 and the low voltage coil being electrically connected with alternating current output conductors 33, as illustrated in Fig. 2. The free ends of the input conductors 32 are provided with a conventional plug coupling element 34 of the type used in connecting devices of this character with conventional house voltage circuits.

Disposed above the upper extremity of the core 24 of the transformer in overlapping relationship with respect thereto is a rectifier 35 of the type commercially known as a copper oxide rectifier. Any suitable rectifying apparatus may be employed, the copper oxide rectifier being shown in the drawings merely for the purpose of illustration. The rectifier 35 includes a central bolt 36 upon which spaced, oxidized copper plates 37 are mounted, and between which are wound successive coils 38. These copper plates are disposed in planes substantially normal to the planes of the side plates 26 and 27 of the transformer core and the end plates of the rectifier are provided with outwardly extending angular flanges 39 having end portions 39' disposed in planes substantially parallel to the planes of the ears 31 of the core side plate 27, the end portion of each flange 39 being disposed adjacent one of the ears 31 of the side plate 27 of the transformer core frame, respectively, and electrically insulated therefrom by a washer 40. The ears 31 and the flanges 39 are rigidly and detachably secured together by bolts 41 which extend through registering apertures in the ears and flanges respectively.

Mounted on the ear 31 and the flange 39 at the front extremity of the combined rectifying and transforming apparatus is a fuse supporting bracket which includes a plate 42 comprising dielectric material and an angular-shaped metal supporting bracket 43. One end portion of the bracket 43 is rigidly fixed to the plate 42 and the other end portion 43' thereof is disposed adjacent and parallel to the plane of the ears 31. Mounted on the plate 42 are spaced fuse coupling elements 44 which are registrable with and preferably adapted to be disposed concentrically with respect to the openings 19 in the front wall of the casing 10 when the rectifying and transforming apparatus is placed in the casing. The left hand fuse coupling element 44, shown in Fig. 2, is grounded on the supporting bracket 43 which is in turn disposed in metal-to-metal contacting relationship with the adjacent end portion of the flange 39. Integrally formed on the upper and lower edges of the inwardly extending end portion 43' of this angular supporting bracket 43, are protruding lips 45 which engage the edges of the end portions of the flanges 39 of the rectifier in substantially close fitting relationship. The contacting relationship between the adjacent sides of the end portions of the flanges 39 and the end portion 43' of the bracket 43, and the contacting relationship between the lips 45 of the latter and the edges of the end portions of the flanges 39 positively locate the fuse supporting bracket with respect to the transformer which is in turn positively located with respect to the casing 10 by the flanges 29 and bolts 30 by which they are secured to the casing.

By virtue of this arrangement and construction of the parts of the apparatus and the manner in which they are fixed together in a predetermined locational relationship, the fuse coupling elements 44 are maintained in accurate alignment with their apertures 19 as well as in concentric relationship with respect thereto so as to guard against short circuiting the fuse coupling elements by contact with the metal casing wall. This is accomplished without the aid of insulating material or excessively large openings in the casing for accommodating the fuse coupling elements which, when the apparatus is properly assembled in the casing, project externally thereof and permit convenient insertion and removal of a fuse 46 by which the circuit of the apparatus is protected.

The output terminals 33 of the transformer are electrically connected with spaced plates 37 of the rectifier which is in turn connected with direct current line conductors 47 and 48, as illustrated in Fig. 2. The direct current line conductor 47 is directly connected to one of the plates 37 of the rectifier and the direct current conductor 48 is electrically connected to the right hand fuse coupling element 44 shown in Fig. 2. The latter fuse coupling element is in turn connected with the left hand fuse element 44 by the fuse 46. This left hand fuse coupling element 44 is, as set forth previously, grounded on the supporting bracket 43 which is in turn grounded on the flange 39 of the transformer, the flange being electrically connected with the bolt 36 by the plate 37 on which it is integrally formed. The bolt 36 is electrically connected internally of the rectifier with the other direct current output conductors, thereby providing a closed circuit between the two direct current lead wires.

The transformer, rectifier and fuse-supporting bracket are, in the foregoing manner, rigidly secured together in a compact assembled relationship providing a unitary structure which may be conveniently removed from and inserted into the casing 10 by simply removing the fuse 46, which operation may be performed from the exterior of the casing. The various parts of the device are stably secured together mainly by the necessary structure of the apparatus and without additional separate brackets and fixtures.

Although but one specific embodiment of the present invention has been shown and described herein, it will be apparent to those skilled in the art that various changes may be made therein without departing from the spirit and substance of the broad invention, the scope of which is commensurate with the appended claims.

I claim:

1. Current rectifying and transforming apparatus including a casing having an opening in one wall for accommodating the passage of said apparatus therein and spaced openings in an opposite wall, a combined transformer and rectifier unit having all portions fixed in assembled relationship independently of said casing and removably insertable in the latter through the opening in said first mentioned casing wall, spaced fuse coupling elements mounted on said unit, each of said elements being registerable with one of said openings of said second mentioned casing wall respectively and adapted to extend therethrough during insertion of said unit into said casing, and a fuse engaged in said casing and located externally of said casing.

2. Electrical apparatus including a casing having an opening in one wall for accommodating the passage of said electrical apparatus thereinto and having spaced apertures in an opposite wall, an instrument insertable in and securable to said casing in a predetermined relationship with respect thereto and having a protruding ear, a fuse support having fuse coupling elements thereon registerable with and extensible through said apertures and including a bracket engageable with one side of said ear and having a lip thereon engageable with an edge of said ear for maintaining said coupling elements in registering relationship with respect to said openings, means for securing said ear and bracket together, and a fuse engaged in said coupling elements and located externally of said casing.

3. Current rectifying and transforming apparatus including a casing having spaced openings therein, a transformer in said casing including a core, a frame fixed to said core comprising spaced side plates each having a flange securable to said casing and one of said side plates having integral projecting portions extending beyond an extremity of said core and disposed in a plane substantially parallel to one side thereof, a rectifier disposed adjacent an extremity of said core in overlapping relation with respect thereto including spaced plates substantially normal to the plane of said ears and each having integral angular projecting portions substantially parallel to the plane of said ears and adjacent one of the latter respectively, a fuse support having fuse coupling elements thereon registerable with and extending through said openings and including a bracket having a part substantially parallel to and engageable with a side of one of said protruding portions and having a lip extending transversely of said side of said protruding portion and engaging an adjacent edge thereof for maintaining said coupling elements in registering relationship with respect to said openings, a member for securing said bracket and protruding portions together, and a fuse engaged in said coupling elements and located externally of said casing.

AVERY B. CHERETON.